United States Patent
Hermes

(10) Patent No.: US 7,945,207 B1
(45) Date of Patent: May 17, 2011

(54) WIRELESS COMMUNICATIONS GATEWAY

(75) Inventor: Jihad Hermes, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 572 days.

(21) Appl. No.: 11/452,400

(22) Filed: Jun. 14, 2006

(51) Int. Cl.
H04B 7/00 (2006.01)

(52) U.S. Cl. ....... 455/41.2; 455/403; 455/515; 455/434; 455/3.03; 455/406

(58) Field of Classification Search .................... 455/15, 455/19, 67.11, 41.2, 403, 406, 466
See application file for complete search history.

(56) References Cited

U.S. PATENT DOCUMENTS

| | | | |
|---|---|---|---|
| 5,822,700 A * | 10/1998 | Hult et al. ............... | 455/466 |
| 5,875,387 A * | 2/1999 | Ayerst ..................... | 340/7.42 |
| 6,393,297 B1 | 5/2002 | Song | |
| 6,687,587 B2 | 2/2004 | Kacel | |
| 6,901,251 B1 | 5/2005 | Kiessling et al. | |
| 6,917,801 B2 | 7/2005 | Witte et al. | |
| 6,996,370 B2 | 2/2006 | De Loye et al. | |
| 7,010,268 B2 * | 3/2006 | Chen ......................... | 455/41.2 |
| 7,035,631 B2 * | 4/2006 | Schwinke et al. ........... | 455/420 |
| 7,302,257 B2 * | 11/2007 | Taketsugu ................ | 455/422.1 |
| 7,489,647 B2 * | 2/2009 | Shin ........................... | 370/310 |
| 7,660,578 B2 * | 2/2010 | Viitamaki et al. ......... | 455/426.2 |
| 2002/0031228 A1 * | 3/2002 | Karkas et al. ................. | 380/270 |
| 2003/0149663 A1 * | 8/2003 | Vonholm et al. .............. | 705/39 |
| 2004/0253947 A1 * | 12/2004 | Phillips et al. ............. | 455/422.1 |
| 2005/0256615 A1 | 11/2005 | Wang et al. | |
| 2007/0072584 A1 * | 3/2007 | Jain et al. ...................... | 455/405 |
| 2007/0219807 A1 * | 9/2007 | Schalk et al. ................. | 704/275 |
| 2010/0016745 A1 * | 1/2010 | Crump et al. ................. | 600/519 |

* cited by examiner

Primary Examiner — Huy Phan

(57) ABSTRACT

Systems and methods for facilitating communications between a monitoring and monitored device using a mobile station are provided. The mobile station includes a wide area network interface for communicating with a monitoring device via a wide area network. The mobile station also includes a short-range wireless network interface for communicating over a short-range wireless communication link with the monitored device. Using these communication links the mobile station can forward data between the monitoring and monitored devices.

19 Claims, 2 Drawing Sheets

WIRELESS COMMUNICATIONS GATEWAY

BACKGROUND OF THE INVENTION

Figure 1:
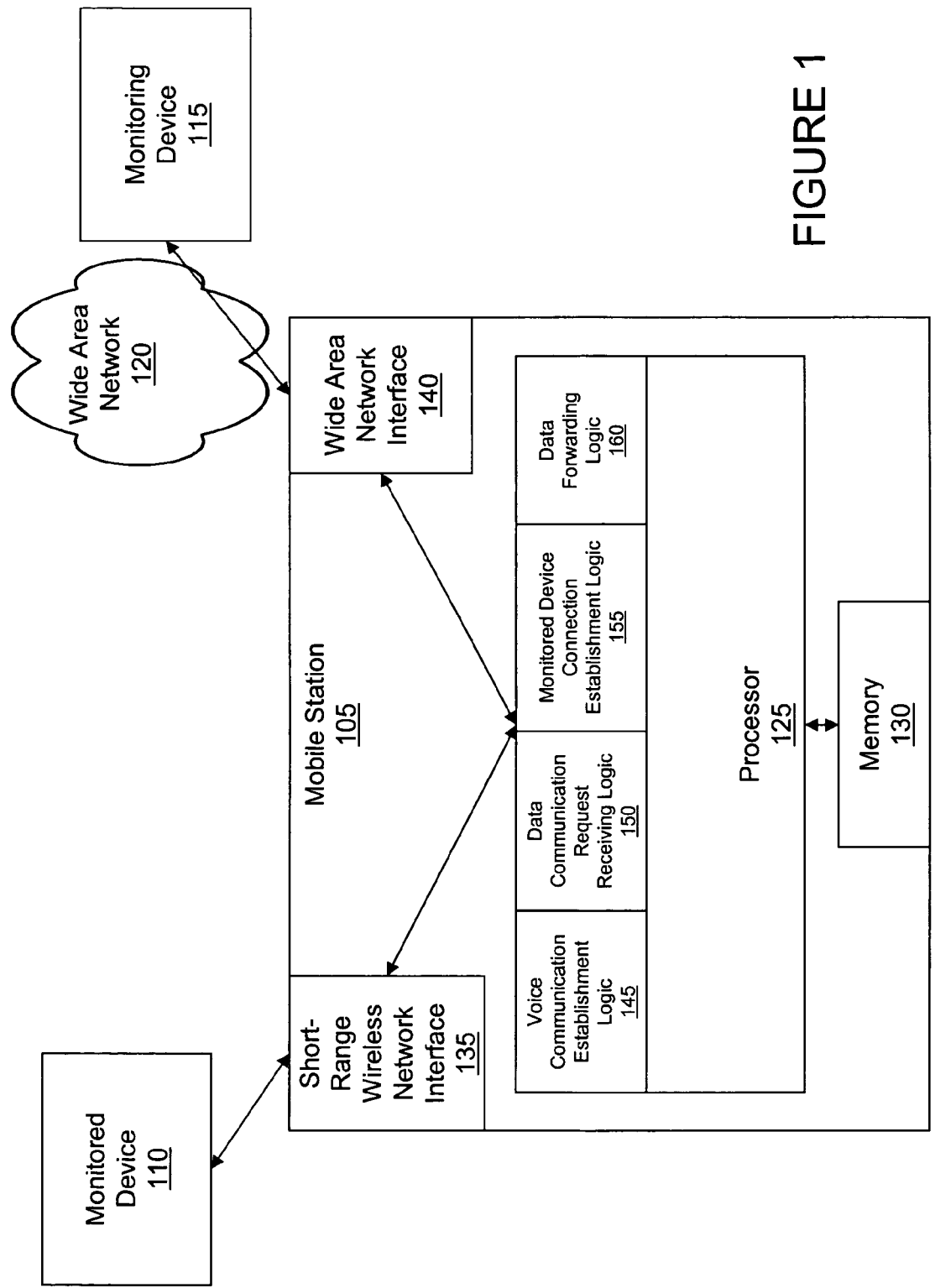

With the advent of wireline telephone systems came the development of telemetry, which allows remote monitoring of processes, functions and devices via telephone systems. Common telemetry systems include remote monitoring of utility services, such as gas, electricity and water services. These telemetry services are commonly provided over fixed wireline communication networks.

SUMMARY OF THE INVENTION

Recently telemetry has incorporated wireless communication systems for monitoring remote devices. In order to communicate between a monitoring facility and the monitored device, these telemetry implementations rely upon dedicated wireless transceivers that are compatible with one or more wireless macro networks. These transceivers, and any associated hardware, can be quite expensive and consume a large amount of power.

The present invention overcomes the above-identified and other deficiencies of conventional systems by employing a mobile station as a gateway between monitoring and monitored devices. Specifically, the mobile station employs a wireless macro network interface for communicating with the monitoring device and a short-range wireless network interface for communicating with the monitored device. Accordingly, the monitored device only needs to have a short-range wireless network interface, which is typically less expensive and consumes less power than a wireless macro network interface.

Other objects, advantages and novel features of the present invention will become apparent from the following detailed description of the invention when considered in conjunction with the accompanying drawings.

BRIEF DESCRIPTION OF THE DRAWING FIGURES

Figure 2:
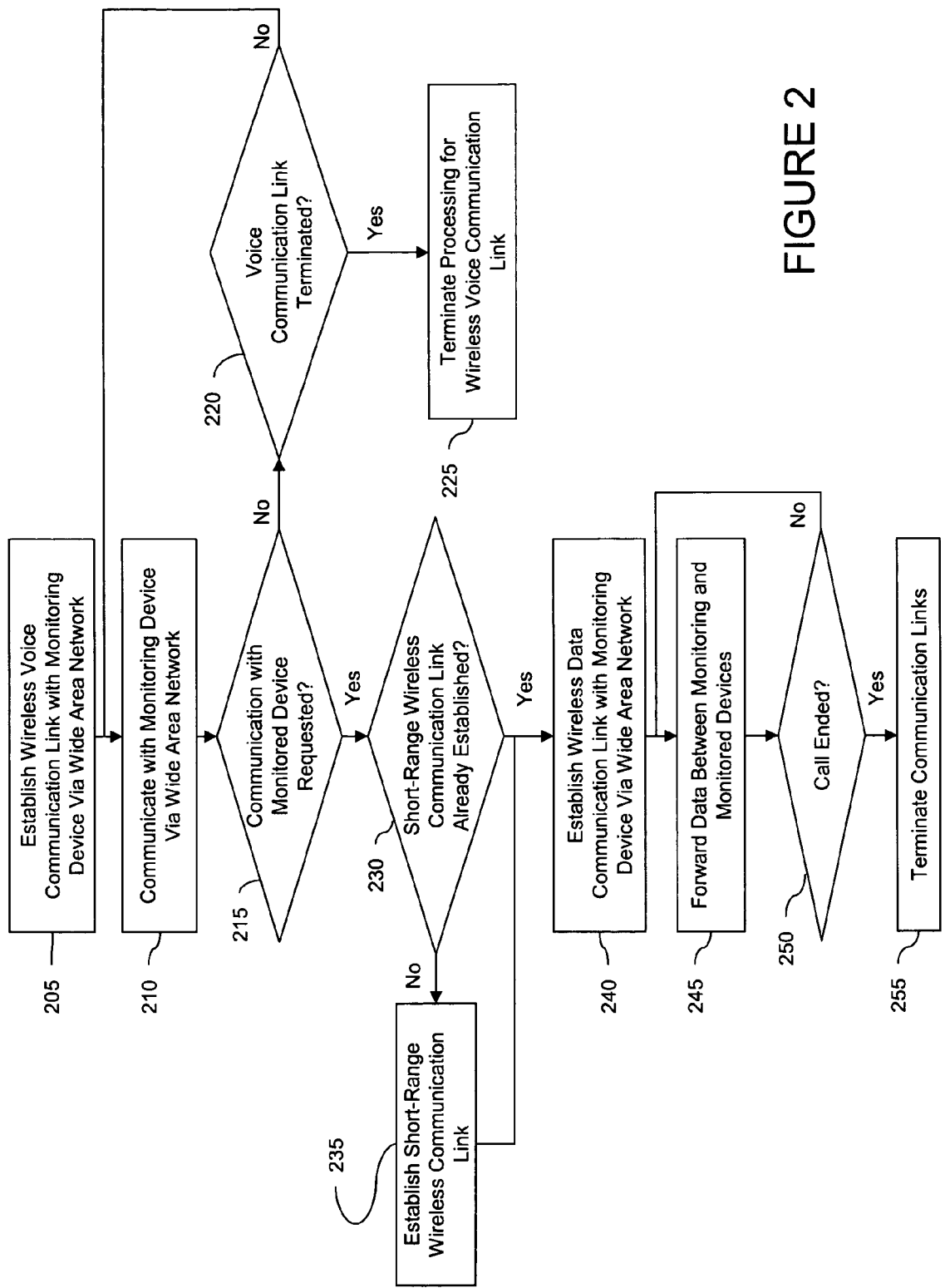

FIG. 1 is a block diagram of an exemplary system in accordance with the present invention; and FIG. 2 is a flow diagram of an exemplary method in accordance with the present invention.

DETAILED DESCRIPTION OF THE PREFERRED EMBODIMENTS

FIG. 1 is a block diagram of an exemplary system in accordance with the present invention. The system includes a mobile station 105, monitored device 110 and monitoring device 115. Mobile station 105 can be any type of mobile station, including a wireless telephone, personal digital assistant, laptop or palmtop computer and/or the like. Monitored device 110 can be any type of device that is capable of being monitored including, but not limited to, motor vehicles, appliances, utility meters and/or the like, including any control systems thereof. Monitoring device 115 can be any type of monitoring device, such as a computer or processor, and can include a human operator or can be partially or completely automated.

Mobile station includes a processor 125 and memory 130. Mobile station 105 also includes a short-range wireless network interface 135 for communicating with a corresponding interface (not illustrated) of the monitored device and a wide area network interface 140 for communicating with monitoring device 115. Mobile station 105 and monitoring device 115 are coupled to each other via wide area network 120. Wide area network 120 can be a wired or wireless network, or a combination of both. For example, wide area network 120 can represent a wireless macro network that is coupled to a data network or the public switched telephone network (PSTN). Monitoring device 115 can then be coupled to the data network or PSTN. Mobile station 105 and monitoring device 115 can be coupled by one or more communication links. These communication links can be voice and/or data communication links and can be carried over voice, data or control channels.

Short-range wireless network interface 135 can be any type of short-range wireless network interface including a Bluetooth, wireless fidelity (Wi-Fi) interface, Zigbee, analog and/or the like interface. The interface can also include a number of short-range wireless network interfaces, if desired. Wide area network interface 140 can include one or more voice and/or data wireless macro network interfaces including, but not limited to, a GSM, CDMA, TDMA, OFDMA and/or the like type of interfaces.

Processor 125 includes logic 145-160 which will be described in more detail below in connection with FIG. 2. Processor 125 can be any type of processor, including a microprocessor, field programmable gate array (FPGA), application specific integrated circuit (ASIC) and/or the like. Memory 130 can be any type of memory including, but not limited to, volatile or non-volatile memory, flash memory or a hard disk, random access memory or read only memory, or any combination thereof. When processor 125 is a microprocessor, logic 145-160 can be processor executable code loaded from memory 130.

FIG. 2 is a flow diagram of an exemplary method in accordance with the present invention. Initially, logic 145 establishes a wireless voice communication link between the mobile station and the monitoring device via wide area network interface 140 and wide area network 120 (step 205). The user of mobile station 105 can then communicate with the monitoring device, or an operator of the monitoring device (step 210). While conducting the voice communication, logic 150 determines whether a communication with the monitored device has been requested (step 215). When communication with the monitored device has been not requested ("No" path out of decision step 215), then processor 125 determines whether the voice communication link has been terminated (step 220). When the voice link has been terminated ("Yes" path out of decision step 220), then processor 125 terminates the processing for the voice communication link (step 225).

When communication with the monitored device has been requested ("Yes" path out of decision step 215), then logic 155 determines whether a short-range wireless communication link has already been established with the monitored device (step 230). When a short-range wireless communication link has not yet been established ("No" path out of decision step 230), then such a link is established (step 235). Once a short-range wireless communication link has been established (step 235 or "Yes" path out of decision step 230), then a wireless data communication link is established with the monitoring device via wide area network interface 140 and wide area network 120 (step 240). Logic 160 then controls the forwarding of data between the monitoring and monitored devices (step 245) until the call ends (step 250). The forwarded data can be related to the operation of the monitored device including status information and/or information for controlling the monitored device. Once the call ends ("Yes" path out of decision step 250), processor 125 terminates the communication links (step 255).

The method described above in connection with FIG. 2 is merely exemplary and variations thereof are considered within the scope of this invention. For example, establishment of the short-range wireless communication link between the mobile station and the monitored device can be performed with user intervention, e.g., the user manipulating a button or selection from a user interface. Moreover, the acts can be performed in a different order from that described above. For example, the wireless data communication link with the monitoring device can be established before the short-range wireless communication link. Additionally, the user of the mobile station can continue to conduct a voice conversation with an operator of the monitoring device while data is being forwarded between the monitoring and monitored devices. Moreover, instead of establishing a voice communication link with the monitoring device, the mobile station can establish a data link.

Exemplary embodiments of the present invention provide systems and methods for using a mobile station to facilitate communications between monitoring and monitored devices. Because many people now have mobile stations that include both a short-range wireless network interface and a wide area network interface, monitored devices need only include a short-range wireless communication interface, which is much less expensive than a wide area network interface.

The present invention is advantageous in many different applications. One application is monitoring a motor vehicle. Specifically, assume that a person has difficulty with the motor vehicle, e.g., when a check engine light is illuminated. The person can contact a service center for the motor vehicle over a wide area network interface to discuss the problem. An operator at the service center can access one or more control systems of the motor vehicle by using the mobile station as a gateway to the motor vehicle's control systems. The operator can request and receive diagnostic information related to the motor vehicle. If desired, the operator may also upload a new or modified control program to update the control system. The motor vehicle, therefore, only needs a short-range wireless network interface instead of a wide area network interface.

Another application would be an appliance, including an electronic appliance (e.g., a stereo, VCR, DVR, DVD player and/or the like) or other appliances (e.g., a refrigerator, stove, microwave oven and/or the like). Again, the appliance need only have a short-range wireless network interface, and the mobile station can act as a gateway between the monitoring device and the appliance. The user of the mobile station can be an owner or operator of the monitored device, or can be a repair person. The data forwarded from the monitoring device to the monitored device can be a diagnostic program and/or updated operating instructions (e.g., adjusting the clock of a VCR).

The present invention can also be used for payment validation. Specifically, the mobile station can act as a gateway between a payment terminal (e.g., a point-of-sale terminal or vending machine) and a payment authorization service (e.g., bank, credit card company or other financial service provider). When a user of the mobile station desires to make a payment, a request for authorization is sent from the mobile station over the wide area network to the payment authorization service. After receiving the authorization, the mobile station can then provide the authorization to the payment terminal for a purchase. In this scenario the payment terminal is the monitored device and the payment service is the monitoring device. This aspect is especially advantageous when the payment terminal is a vending machine. The operator of the vending machine can increase sales by allowing persons who may not be carrying change or small bills to make purchases, while avoiding the need for a wide area network communication interface in the vending machine.

Although exemplary embodiments have been described in which the monitored device includes a short-range wireless network interface, the present invention is equally applicable to a monitored device having both a wide area network and short-range wireless network interface. In this case, the mobile station can still act as a gateway between the monitoring and monitored devices.

Exemplary embodiments have been described in connection with monitoring and monitored devices. It should be recognized that these terms are used for ease of explanation and not limitation, and in some embodiments the monitoring device can also control the monitored device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for facilitating communications between monitoring and monitored devices, the method comprising the acts of:
   establishing, by a mobile station, a voice communication link with a monitoring device via a wide area network;
   receiving, by the mobile station, a request for a data communication link with a monitored device;
   establishing, by the mobile station, the data communication link with the monitored device, the data communication link being a short-range wireless communication link; and
   forwarding, by the mobile station, data between the monitoring and monitored devices;
   wherein the monitoring and monitored devices communicate with each other via the mobile station,
   wherein the mobile station acts as a gateway between the monitoring device and the monitored device, and
   wherein data received from the monitored device is forwarded to the monitoring device via a wireless control channel.

2. The method of claim 1, further comprising the act of:
   establishing a data communication link between the mobile station and the monitoring device, wherein the data received from the monitored device is forwarded to the monitoring device via the data communication link.

3. The method of claim 1, wherein data forwarded from the monitored device includes diagnostic data related to operation of the monitored device.

4. The method of claim 3, wherein data forwarded from the monitoring device includes a request for the diagnostic data.

5. The method of claim 4, wherein the request for diagnostic data includes an instruction for the monitored device to perform a diagnostic test.

6. The method of claim 1, wherein the monitored device is a component of an appliance.

7. The method of claim 1, wherein the monitored device is a component of a motor vehicle.

8. The method of claim 1, wherein the short-range wireless communication link is a Bluetooth wireless communication link.

9. The method of claim 1, wherein the short-range wireless communication link is a Wi-Fi communication link.

10. The method of claim 1, further comprising the act of performing a payment validation process, wherein the monitored device is a payment terminal and the monitoring device is a payment authorization service provider.

11. A mobile station comprising:
a processor;
a wireless wide area network interface coupled to the processor; and
a short-range wireless communication interface coupled to the processor,
wherein the processor includes
logic for establishing a voice communication link with a monitoring device via the wide area network interface;
logic for receiving a request for a data communication link with a monitored device;
logic for establishing the data communication link with the monitored device, the data communication link being a short-range wireless communication link; and
logic for forwarding data between the monitoring and monitored devices;
wherein the monitoring and monitored devices communicate with each other via the mobile station,
wherein the mobile station acts as a gateway between the monitoring device and the monitored device, and
wherein data forwarded from the monitored devices towards the monitoring device is transmitted towards the monitoring device via a wireless control channel.

12. The mobile station of claim 11, further comprising:
a memory,
wherein the processor is a microprocessor, and the logic is loaded into the processor from the memory.

13. The mobile station of claim 11, wherein the processor is an application specific integrated circuit (ASIC) or field programmable gate array.

14. The mobile station of claim 11, wherein the short-range wireless communication interface is a Bluetooth interface.

15. The mobile station of claim 11, wherein the short-range wireless communication interface is a Wi-Fi interface.

16. The mobile station of claim 11, wherein the wireless wide area network interface supports voice and data communications.

17. The mobile station of claim 11, wherein the data forwarded between the monitoring and monitored devices includes a request for diagnostic information regarding the monitored device.

18. The mobile station of claim 11, wherein the data forwarded between the monitoring and monitored devices includes a control program for the monitored device.

19. The mobile station of claim 11, wherein the monitored device is a payment terminal, the monitoring device is a payment authorization service provider and the mobile station acts as a gateway for payment validation.

* * * * *